United States Patent
Chang et al.

(10) Patent No.: US 9,891,659 B2
(45) Date of Patent: Feb. 13, 2018

(54) DISPLAY DEVICE

(71) Applicant: Innolux Corporation, Miao-Li County (TW)

(72) Inventors: Chih-Jen Chang, Miao-Li County (TW); Chun-Yi Chen, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 163 days.

(21) Appl. No.: 14/727,962

(22) Filed: Jun. 2, 2015

(65) Prior Publication Data
US 2015/0362950 A1    Dec. 17, 2015

(30) Foreign Application Priority Data

Jun. 11, 2014  (TW) .............................. 103210256 U

(51) Int. Cl.
*G09F 13/08*  (2006.01)
*G06F 1/16*   (2006.01)

(52) U.S. Cl.
CPC .......... *G06F 1/1601* (2013.01); *G06F 1/1637* (2013.01)

(58) Field of Classification Search
CPC .... G06F 1/1601; G06F 1/1637; G02B 6/0093
USPC .................................... 362/97.1; 349/58, 60
See application file for complete search history.

(56) References Cited

U.S. PATENT DOCUMENTS

| | | | |
|---|---|---|---|
| 6,421,231 B1 * | 7/2002 | Jung | G06F 1/1616 248/918 |
| 2007/0091640 A1 * | 4/2007 | Kim | G02B 6/0016 362/612 |
| 2012/0250284 A1 * | 10/2012 | Abe | G06F 1/162 361/807 |
| 2013/0077227 A1 * | 3/2013 | Chen | G06F 1/1637 361/679.27 |
| 2014/0016346 A1 * | 1/2014 | Hsu | H05K 5/0017 362/606 |

* cited by examiner

Primary Examiner — Anh Mai
Assistant Examiner — Matthew Peerce
(74) Attorney, Agent, or Firm — McClure, Qualey & Rodack, LLP

(57) ABSTRACT

A display device including a back cover, a frame, a display panel and a stiffener is provided. The display panel is disposed between the back cover and the frame. The stiffener, disposed between the display panel and the back cover, has an opening and includes a main body and at least one fixing member. The main body includes a first portion, a second portion, a third portion and a fourth portion which are one-piece formed and enclose the opening. The first portion has a first outer edge. The second portion has a second outer edge. The fixing member is disposed on the first outer edge. The width of the second portion at the connecting position between the first portion and the second portion is equal to or larger than the distance between the second outer edge and the center of the fixing member.

12 Claims, 4 Drawing Sheets

DISPLAY DEVICE

This application claims the benefit of Taiwan application Serial No. 103210256, filed Jun. 11, 2014, the subject matter of which is incorporated herein by reference.

TECHNICAL FIELD

The invention relates in general to a display device, and more particularly to a display device with stiffener.

BACKGROUND

In recent years, the development of electronic products is directed towards slimness and lightweight. When thinner and lighter materials or hollowed structures are applied in notebooks to reduce the weight, the overall strength is weakened at the same time. For example, since the strength of the casing is weakened, the stress generated when a notebook is opened or closed may cause the display panel of the display device to be deformed and generate pooling phenomenon. Even worse, the panel might be damaged and generate dead pixels or mura.

Therefore, it has become a prominent task for the industries to provide a display device with robust strength and lightweight.

SUMMARY

The invention is directed to a display device with a stiffener disposed therein for enhancing the strength of the display device.

According to one embodiment of the present invention, a display device is provided. The display device includes a back cover, a frame, a display panel and a stiffener. The display panel is disposed between the back cover and the frame and has a display surface facing the frame. The stiffener is disposed between the display panel and the back cover having an opening, and includes a main body and at least one fixing member. The main body includes a first portion, a second portion, a third portion and a fourth portion. The first portion, the second portion, the third portion and the fourth portion are one-piece formed and enclose the opening. The first portion is connected with the second portion and the fourth portion, and has a first outer edge. The second portion has a second outer edge. The fixing member is disposed on the first outer edge and near the second portion for fixing the stiffener onto the back cover. A width of the second portion at the connecting position between the first portion and the second portion is equal to or larger than a distance between the second outer edge and a center of the fixing member.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
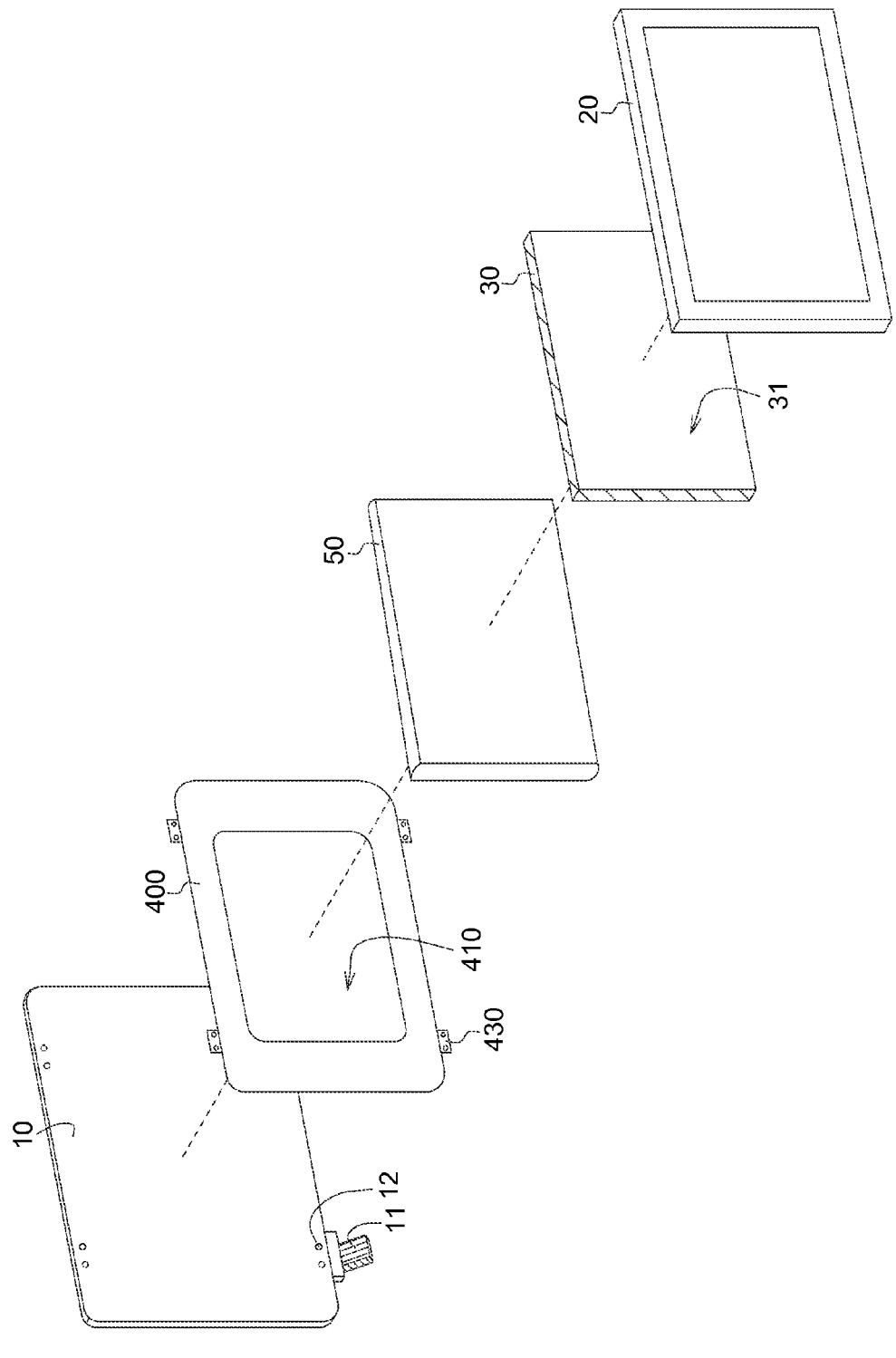
FIG. 1 is a 3D decomposition diagram of a display device according to an embodiment of the invention.

A number of embodiments are disclosed below with accompanying drawings for elaborating the invention. It should be noted that the drawings are simplified so as to provide clear descriptions of the embodiments of the invention, and the scales used in the drawings are not based on the scales of actual products. However, the embodiments of the invention are for detailed descriptions only, not for limiting the scope of protection of the invention.

The invention provides a display device including a back cover, a frame, a display panel and a stiffener. The display panel is disposed between the back cover and the frame, and has a display surface facing the frame. The stiffener is disposed between the display panel and the back cover, and has an opening. The stiffener includes a main body and at least one fixing member. The main body includes a first portion, a second portion, a third portion and a fourth portion. The first portion, the second portion, the third portion and the fourth portion are one-piece formed and enclose the opening. The first portion is connected with the second portion and the fourth portion, and has a first outer edge. The second portion has a second outer edge. The fixing member is disposed on the first outer edge and near the second portion, and used for fixing the stiffener onto the back cover. A width of second portion at the connecting position between the first portion and the second portion is equal to or larger than a distance between the second outer edge and a center of the fixing member.

The stiffener is capable of enhancing the strength of the display device of the invention. When the display device is pushed by an external force, the stiffener may avoid the display panel from being bent and deformed. In comparison to an ordinary stiffener, the stiffener of the invention is more robust through the adjustment in the design of the main body and is lighter through the adjustment in the design of the opening. A number of embodiments are disclosed below for exemplary and explanatory purposes.

Referring to FIG. 1, a 3D decomposition diagram of a display device 1 according to an embodiment of the invention is shown. The display device 1 includes a back cover 10, a frame 20, a display panel 30 and a stiffener 400. The back cover 10 includes a hinge 11 and a keyhole 12. The hinge 11 is used for combining the stiffener 400 with the back cover 10. The frame 20 and the back cover 10 are assembled to form an accommodation space capable of receiving other elements of the display device 1, such as but not limited to the display panel 30 and the stiffener 400. The display panel 30 is disposed between the back cover 10 and the frame 20, and has a display surface 31 facing the frame 20. The stiffener 400 is disposed between the back cover 10 and the display panel 30, and has an opening 410 and a fixing member 430. The fixing member 430 may be engaged in the keyhole 12 of the back cover 10 by a fastener, such as a screw (not illustrated in the diagram), for fixing the stiffener 400 onto the back cover 10.

Figure 2:
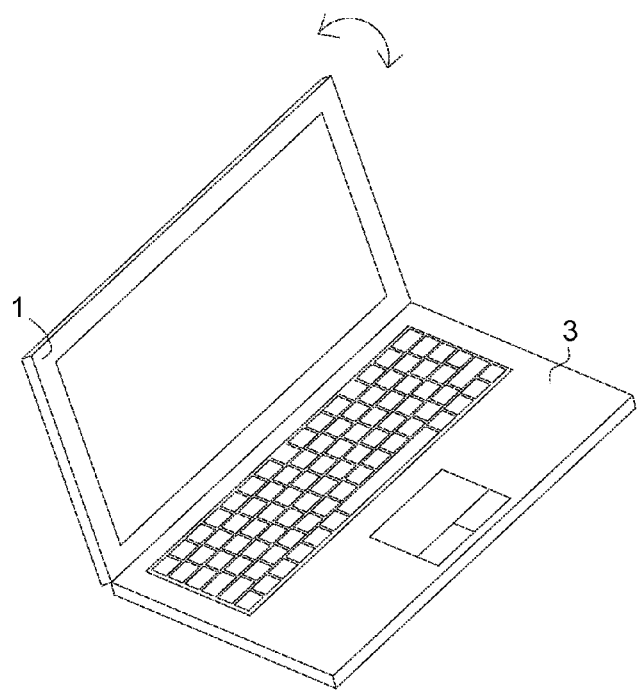
FIG. 2 is a schematic diagram of a display device according to an embodiment of the invention.

FIG. 2 is a schematic diagram of an electronic device using the display device 1 of the invention. As indicated in FIG. 2, the display device 1 may be used in a portable electronic device, such as a notebook 2. Referring to FIG. 1 and FIG. 2, the display device 1 is connected with the main body 3 of the notebook 2 through the hinge 11 of the back cover 10, such that the display device 1 may be rotated or closed with respect to the main body 3 (along an arrow direction). Besides, the signal lines of the display device 1 can be connected with the main body 3 through the hinge 11.

When the display device 1 is rotated or opened, a stress will be generated. One of the problems the invention aims to resolve is how to reduce the impact of stress on the display panel 30.

The display panel 30 is not subjected to any particular varieties. For example, the display panel 30 may be realized by a non-self-luminous thin film transistor liquid crystal display (TFT-LCD) panel, or a self-luminous organic light-emitting diode (OLED) display panel. When the non-self-luminous display panel 30 is used, as indicated in FIG. 1, a backlight module 50 (such as including a backlight source and a light guide plate) may be disposed between the stiffener 400 and the display panel 30 to provide the light required for displaying an image.

In one embodiment, the stiffener 400 may have a size slightly larger than a size of the display panel 30, such that the stiffener 400 can support the display panel 30. The back cover 10 and the frame 20 both have a size slightly larger than the size of the stiffener 400 for receiving the stiffener 400 and the display panel 30. The display device 1 of the invention is further equipped with a stiffener 400 for increasing the overall strength of the display device 1. The disposition of the stiffener 400 enhances the structural strength of the display device 1 and maintains the features of thinness and lightweight at the same time. Different examples of the stiffener of the invention are disclosed below with accompanying drawings FIG. 3 to FIG. 7.

Example 1

Figure 3:
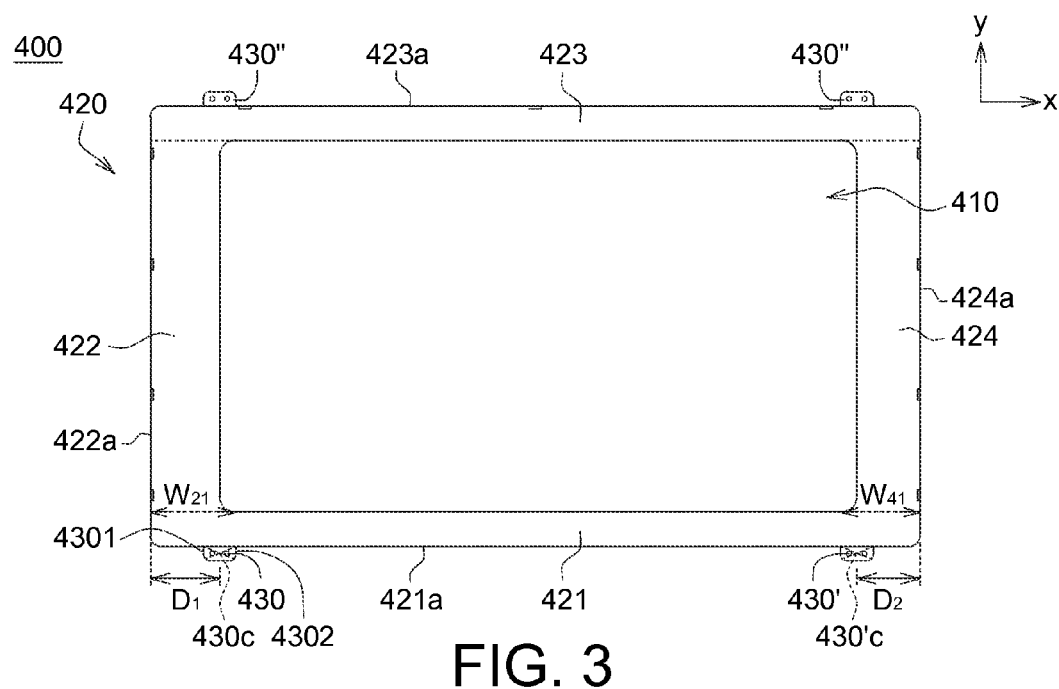
FIGS. 3-7 are planar diagrams of different examples of the stiffeners according to an embodiment of the invention.

FIG. 3 is a planar diagram of example 1 of a stiffener according to an embodiment of the invention. The stiffener 400 has an opening 410, and includes a main body 420 and at least one fixing member 430. The shape of the stiffener 400 corresponds to the shape of the display panel 30 (illustrated in FIG. 1) and is exemplified by a rectangular shape in the present example. The opening 410 is an enclosed opening designed for reducing weight and saving material for the stiffener 400. The main body 420 includes a first portion 421, a second portion 422, a third portion 423 and a fourth portion 424. The first portion 421, the second portion 422, the third portion 423 and the fourth portion 424 are all strip-shaped and one-piece formed, and enclose the opening 410. The first portion 421 is connected with the second portion 422 and the fourth portion 424. The inner side at the connecting position between the first portion 421 and the second portion 422 may be designed as an arced fillet, such that the junction between the connecting position and the opening 410 has an arced edge. The first portion 421 and the third portion 423 are extended along the first direction (the X-axis), and the second portion 422 and the fourth portion 424 are extended along the second direction (the Y-axis), such that the first portion 421 is substantially perpendicular to the second portion 422 and the fourth portion 424. The first portion 421, the second portion 422, the third portion 423 and the fourth portion 424 enclose the opening 410 in order. The first portion 421 corresponds to the bottom of the main body 420, the second portion 422 corresponds to the left-hand side of the main body 420, the third portion 423 corresponds to the top of the main body 420, and the fourth portion 424 corresponds to the right-hand side of the main body 420. Here, "the top", "the bottom", "the left-hand side" and "the right-hand side" are relative positions relative to a horizontal plane. The first portion 421 corresponding to the bottom is adjacent to the hinge 11 of the back cover 10 (illustrated in FIG. 1), and third portion 423 corresponding to the top is away from the hinge 11. That is, the hinge 11 of the back cover 10 is adjacent to the first portion 421 and corresponding to the fixing member 430. The first portion 421 has a first outer edge 421a, and the second portion 422 has a second outer edge 422a. The fixing member 430 is disposed on the first outer edge 421a of the first portion 421 and near the second outer portion 422. The fixing member 430 may be engaged in the keyhole 12 of the back cover 10 for fixing the stiffener 400 onto the back cover 10.

As indicated in FIG. 3, two ends of the first portion 421 are connected with the second portion 422 and the fourth portion 424 respectively. The first outer edge 421a has a U shape, and the second outer edge 422a is a straight line. The width $W_{21}$ of the second portion 422 at the connecting position between the second portion 422 and the first portion 421 is equal to or larger than the distance $D_1$ between the second outer edge 422a and the center 430c of the fixing member 430. That is, $W_{21} \geq D_1$. In the present example, both the second portion 422 and the first portion 421 are strip-shaped with substantially uniform width. Therefore, the width $W_{21}$ of the second portion 422 at the connecting position between the second portion 422 and the first portion 421 is substantially equal to the width of the second portion 422 in the first direction (the X-axis) extended from the first portion 421.

Suppose the size of the display panel 30 of the display device 1 (FIG. 1) is 15.6 inches. If the distance $D_1$ between the second outer edge 422a and the center 430c of the fixing member 430 is 30 millimeters (mm) and the width $W_{21}$ of the second portion 422 at the connecting position between the second portion 422 and the first portion 421 is 20 mm, it may be known from the experimental results that the display panel 300 will generate obvious pooling phenomenon when the display device 1 is opened or closed. If the distance $D_1$ between the second outer edge 422a and the center 430c of the fixing member 430 is 30 mm, and the width $W_{21}$ of the second portion 422 at the connecting position between the second portion 422 and the first portion 421 is increased to be $W_{21} \geq D_1$ (for example, the second portion 422 is widened and the width $W_{21}$ is increased to 30-35 mm), it may be known from the experimental results that the display panel 30 will not generate pooling phenomenon when the display device 1 is opened or closed. Therefore, if the width $W_{21}$ of the second portion 422 at the connecting position between the second portion 422 and the first portion 421 of the stiffener 400 is equal to or larger than the distance $D_1$ between the second outer edge 422a and the center 430c of the fixing member 430, that is, $W_{21} \geq D_1$, the strength of the display device 1 may be enhanced and the stiffener 400 which is fixed onto the back cover 10 through the fixing member 430 will not be easily deformed. This is because the stiffener 400 is fixed on the back cover 10 by the fixing member 430, and when the display device 1 receives a stress, the stress of the stiffener 400 will concentrate at the center 430c of the fixing member 430. Through the design of increasing the width $W_{21}$ of the second portion 422 at the connecting position between the second portion 422 and the first portion 421 of the stiffener 400 to be equal to (or larger than) the distance $D_1$ between the center 430c of the fixing member 430 and the second outer edge 422a, the strength of the stiffener 400 at the center 430c of the fixing member 430 is enhanced, and the strength of the display device 1 is enhanced accordingly.

As indicated in FIG. 3, the fixing member 430 includes a first side 4301 and a second side 4302 which are located at two opposite sides of the center 430c of the fixing member 430. The second side 4302 is farther away from the second outer edge 422a of the second portion 422 than the first side 4301 away from the second outer edge 422a of the second portion 422. In an embodiment, the width $W_{21}$ of the second portion 422 at the connecting position between the second portion 422 and the first portion 421 is smaller than or equal to the distance between the second outer edge 422a and the second side 4302 of the fixing member 430. Thus, the stiffener 40 may maintain lighter weight and will be prevented from deformation.

Since the hinge 11 of the back cover 10 is one of the concentration points of stress on the back cover 10, one of the fixing members 430 may be disposed at a position corresponding to the hinge 11 as indicated in FIG. 1. That is, a portion of the keyholes 12 is disposed at a position corresponding to the hinge 11, such as above the hinge 11. Through such design, the stress generated when the display device 1 is opened or closed will be reduced, and the strength of the display device 1 can further be enhanced.

Also, the stiffener 400 may have a symmetric design. As indicated in FIG. 3, the stiffener 400 may have more than one fixing member (e.g. four fixing members are illustrated in FIG. 3). Of the four fixing members, fixing members 430 and 430' are disposed on the first outer edge 421a of the first portion 421, the fixing member 430' is disposed near the fourth portion 424, and two fixing members 430" are disposed on the third outer edge 423a of the third portion 423. In the stiffener 400, the fourth portion 424 is opposite to the second portion 422 and may have the same design as the second portion 422. In other words, the fourth portion 424 has a fourth outer edge 424a, the width $W_{41}$ of the fourth portion 424 at the connecting position between the fourth portion 424 and the first portion 421 may be designed to be larger than or equal to the distance $D_2$ between the fourth outer edge 424a and the center 430'c of the fixing member 430', that is, $W_{41} \geq D_2$. Such design of increasing both the width $W_{21}$ of the second portion 422 at the connecting between the second portion 422 and the first portion 421 and the width $W_{41}$ of the fourth portion 424 at the connecting between the fourth portion 424 and the first portion 421 can further enhance the strength of the stiffener 400.

Example 2

Figure 4:
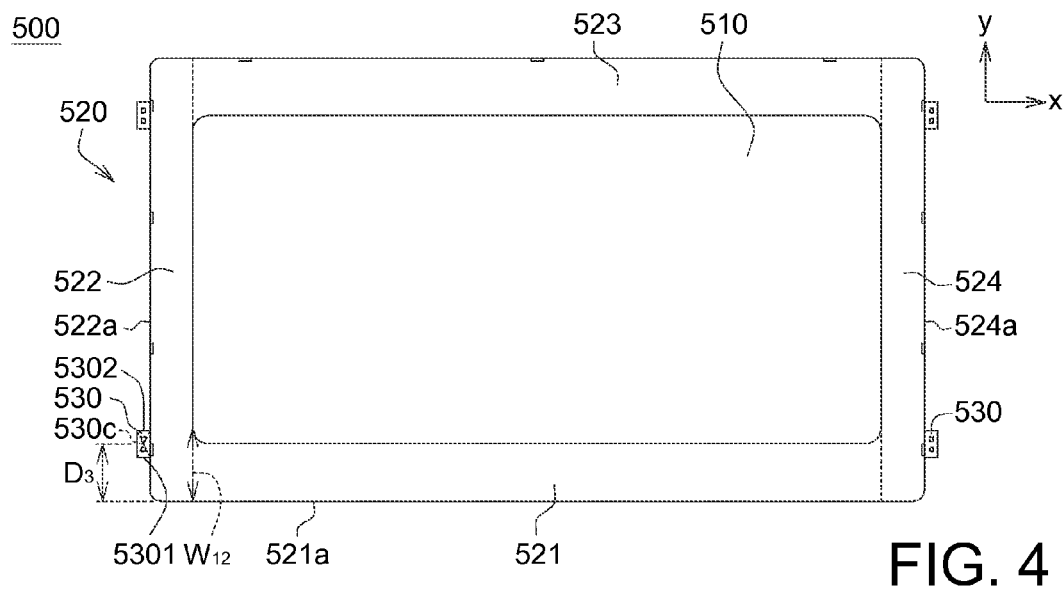

FIG. 4 is a planar diagram of example 2 of a stiffener according to an embodiment of the invention. The stiffener 500 of FIG. 4 is different from the stiffener 400 of FIG. 3 in the positions of the fixing members 530, and similarities between the two stiffeners are not repeated.

In FIG. 4, the fixing members 530 are disposed on the second outer edge 522a of the second portion 522 and the fourth outer edge 524a of the fourth portion 524, that is, on the left-hand side (the second portion 522) and the right-hand side (the fourth portion 524) of the main body 520. The two ends of second portion 522 are connected with the first portion 521 and the third portion 523 respectively. Since the width $W_{12}$ of the first portion 521 at the connecting position between the first portion 521 and the second portion 522 is larger than or equal to the distance D3 between the first outer edge 521a and the center 530c of the fixing member 530, that is, $W_{12} \geq D_3$, the strength of the stiffener 500 around the fixing member 530 is significantly enhanced, such that the stiffener 500 will not be easily deformed, and the strength of the display device 1 (illustrated in FIG. 1) is increased. Besides, the width $W_{12}$ of the first portion 521 at the connecting position between the first portion 521 and the second portion 522 may be smaller than or equal to the distance between the first outer edge 521a and the second side 5302 of the fixing member 530. Thus, the stiffener 500 may have a larger opening 510, such that lighter weight and lower cost may be maintained.

Example 3

Figure 5:
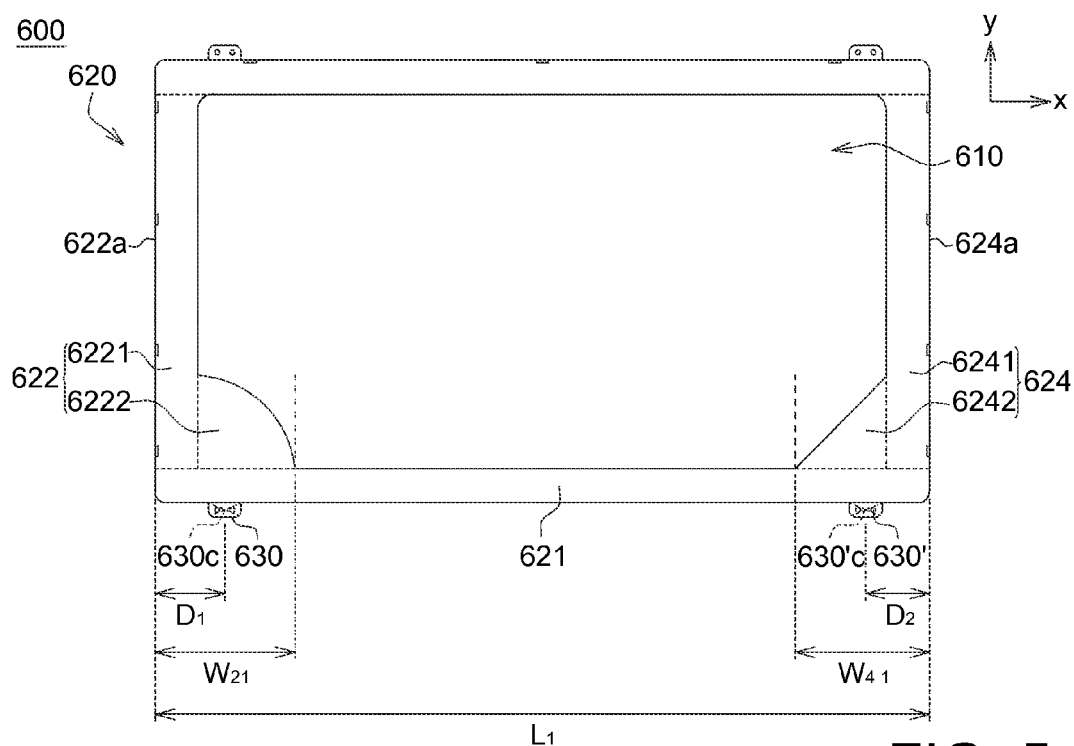
Figure 6:
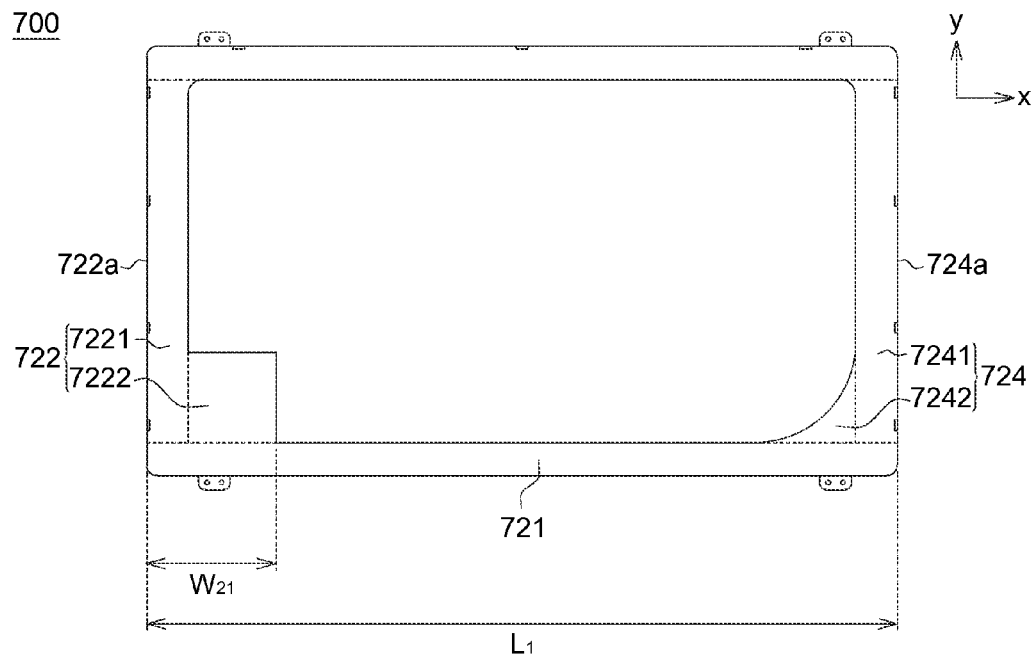

Referring to FIG. 5, a planar diagram of example 3 of a stiffener according to an embodiment of the invention is illustrated. The stiffener 600 of FIG. 5 is different from the stiffener 400 of FIG. 2 in the shape of the second portion, and similarities between the two stiffeners are not repeated. As indicated in FIG. 5, the second portion 622 has a second outer edge 622a. The second portion 622 includes a first stripe part 6221 and a first extending part 6222. The first extending part 6222 contacts the first stripe part 6221 and the first portion 621, and extends from the first stripe part 6221 toward the opening 610. The width $W_{21}$ of the second portion 622 at the connecting position between the second portion 622 and the first portion 621 is larger than the distance $D_1$ between the second outer edge 622a and the center 630c of the fixing member 630, that is, $W_{21} \geq D_1$. The design of the protruded first extending part 6222 enhances strength on the corner of the stiffener 600 (the bottom left corner of the stiffener 600), so that the strength of the stiffener 600 around the center 630c of the fixing member 630 is enhanced, and the strength of the display device 1 is enhanced accordingly.

The design of the first extending part 6222 of the second portion 622 makes the second portion 622 have non-uniform width in the first direction (the X-axis) extended from the first portion 621. The larger the width $W_{21}$ of the second portion 622 at the connecting position between the second portion 622 and the first portion 621, the larger the strength of the stiffener 600. In an embodiment, suppose the length of the first portion 621 in the X-axis direction is $L_1$. If the width $W_{21}$ of the second portion 622 at the connecting position between the second portion 622 and the first portion 621 is between 10% and 15% of the length of the first portion, that is, $0.15L_1 \geq W_{21} \geq 0.1L_1$, the stiffener 600 will have sufficient strength to avoid the pooling phenomenon when the display device 1 of FIG. 1 is opened or closed, and at the same time, the opening 610 is large enough, and both the weight and the cost of the stiffener can be reduced.

In FIG. 5, the first extending part 6222 is disposed at the connecting position between the second portion 622 and the first portion 621, that is, the bottom left corner of the stiffener 600, and contacts the first portion 621. Apart from the bottom left corner as exemplified above, the extending part may also be disposed at other corners of the stiffener 600. For example, the extending part may be disposed at the connecting position between the fourth portion 624 and the first portion 621. That is, a second extending part 6242 is disposed at the bottom right corner of the stiffener 600. As indicated in FIG. 5, the fourth portion 624 includes a second stripe part 6241 and the second extending part 6242. The second extending part 6242 contacts the second stripe part 6241 and the first portion 621, and extends from the first stripe part of the fourth portion toward the opening. The width $W_{41}$ of the fourth portion 624 at the connecting position between the fourth portion 624 and the first portion 621 is larger than or equal to the distance $D_2$ between the fourth outer edge 624a and the center 630'c of the fixing member 630', that is, $W_{41} \geq D_2$.

The design of the second extending part 6242 makes the fourth portion 624 have non-uniform width in the direction (the X-axis) extended from the first portion 621. Like the first extending part 6222, if the width W41 of the fourth portion 624 at the connecting position between the fourth portion 624 and the first portion 621 is between 10% and 15% of the length of the first portion, that is, $0.15L1 \geq W41 \geq 0.1L1$, the strength of the stiffener 600 will be enhanced to avoid the pooling phenomenon when the display device 1 of FIG. 1 is opened or closed, and at the same time, the weight of the stiffener 600 is only slightly increased. By the same token, the four corners of the stiffener 600 may all have an extending part. Since the stiffener 600 receives a larger stress at the portion near the hinge 11 of the back cover 10, the stiffener 600 is equipped with extending parts only at the portions near the hinge 11 as indicated in FIG. 5. That is, one extending part is disposed at the portion of the second portion 622 near the first portion 621 (the bottom left corner of the stiffener 600) and another extending part is disposed at the portion of the fourth portion 624 near the first portion 621 (the bottom right corner of the stiffener 600).

Moreover, the shape of the first extending part 6222 may be identical to or different from the shape of the second extending part 6242. As indicated in FIG. 5, the first extending part 6222 of the second portion 622 has a fan shape. The second extending part 6242 of the fourth portion 624 has a triangular shape. However, the shape of the extending part is not limited to the above exemplifications. Referring to the stiffener 700 of FIG. 6, the first extending part 7222 of the second portion 722 has a rectangular shape. The second extending part 7242 of the fourth portion 724 is a platelet shape with an arced edge. Although the extending parts may have different shapes, the strength of the stiffener 600 or 700 will be enhanced as long as the extending parts are disposed at positions satisfying the condition that the width $W_{21}$ of the second portion 722 at the connecting position between the extending part (such as the second portion 722) and the first portion 721 is between 10% and 15% of the length of the first portion 721, that is, $0.15L_1 \geq W_{21} \geq 0.1L_1$, such that the display device 1 (illustrated in FIG. 1) may have sufficient strength and will not generate pooling phenomenon when the display device 1 is opened or closed.

Example 4

Figure 7:
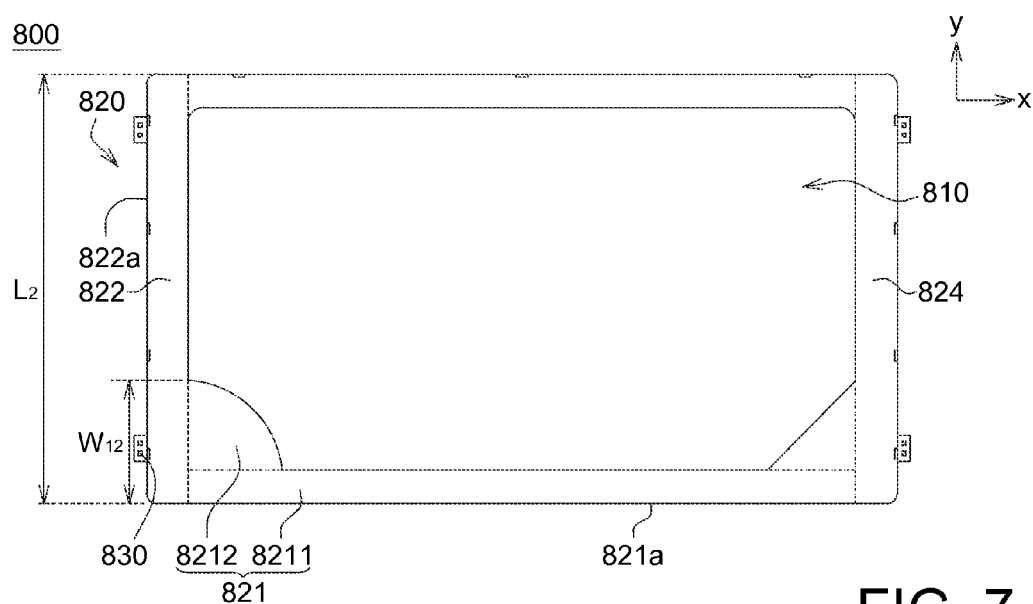

Referring to FIG. 7, a planar diagram of example 4 of a stiffener according to an embodiment of the invention is shown. The stiffener 800 of FIG. 7 is different from the stiffener 600 of FIG. 5 in the positions of the fixing members, and similarities between the two stiffeners are not repeated. The fixing members 830 of FIG. 7 are disposed at the second portion 822 (the left-hand side of the stiffener 800) and the fourth portion 824 (the right-hand side of the stiffener 800) of the main body 820, but the fixing members 630 of FIG. 5 are disposed at the first portion 621 (the bottom of the stiffener 600) and the third portion 623 (the top of the stiffener 600). As indicated in FIG. 7, the first portion 821 includes a first stripe part 8211 and a first extending part 8212. The first extending part 8212 is connected with one end of the first stripe part 8211, and is connected with the second portion 822. The first extending part 8212 makes the first portion 821 have non-uniform width in the direction (the Y-axis) extended form the second portion 822. Suppose the length of the second portion is $L_2$. If the width $W_{12}$ of the first portion 821 at the connecting position between the first portion 821 and the second portion 822 is between 10% and 15% of the length of the second portion 822, that is, $0.15L_2 \geq W_{12} \geq 0.1L_2$, the strength of the stiffener 800 will be enhanced to avoid the pooling phenomenon being generated when the display device 1 of FIG. 1 is opened or closed.

Despite being divided into several elements such as opening, first portion, second portion, third portion, fourth portion, fixing member, stripe part and extending part in the above descriptions, the stiffener of the invention is one-piece formed in the present invention. For example, the stiffener may be formed by lathing or stamping an iron piece directly. However, the material and manufacturing method of the stiffener are not restricted in the invention.

The display device of the invention enhances the overall strength by disposing a stiffener between the display panel and the back cover to avoid pooling phenomenon, dead pixels and mura, such that the display quality of the display device is improved and product aesthetics is elevated. Meanwhile, by adjusting the shape and width of the main body of the stiffener and relative position between the main body and the fixing member, the opening may be maintained, and both the weight and manufacturing cost of the stiffener may be reduced.

While the invention has been described by way of example and in terms of the preferred embodiment (s), it is to be understood that the invention is not limited thereto. On the contrary, it is intended to back cover various modifications and similar arrangements and procedures, and the scope of the appended claims therefore should be accorded the broadest interpretation so as to encompass all such modifications and similar arrangements and procedures.

What is claimed is:

1. A display device, comprising:
    a back cover;
    a frame;
    a display panel having a display surface, wherein the display panel is disposed between the back cover and the frame, and the display surface faces the frame;
    a stiffener disposed between the display panel and the back cover, wherein the stiffener has an opening, and comprises:
    a main body comprising a first portion, a second portion, a third portion and a fourth portion, wherein the first portion, the second portion, the third portion and the fourth portion are one-piece formed and enclose the opening, the first portion is extending along a first direction and connected with the second portion and the fourth portion, the first portion has a first outer edge and a first inner edge, the second portion is extending along a second direction and has a second outer edge and a second inner edge, the first inner edge and the second inner edge are adjacent to the opening, wherein the first portion has a first length in the first direction, the second portion has a second length in the second direction substantially perpendicular to the first direction, and the first length is greater than the second length; and
    a fixing member disposed on the first outer edge and near the second portion, wherein the fixing member has two holes, a center of the fixing member is between the two holes,
    wherein, a width of the second portion at a connecting position between the first portion and the second portion is equal to or greater than a distance between the second outer edge and the center of the fixing member, wherein an extending line of the second inner edge is passing through a space between the two holes of the fixing member.
2. The display device according to claim 1, wherein the fixing member comprises a first side and a second side opposite to the first side, and the second side is farther away from the second outer edge than the first side from the second outer edge, the width of the second portion at the connecting position between the first portion and the second portion is smaller than or equal to a distance between the second outer edge and the second side of the fixing member.

3. The display device according to claim 1, further comprising another fixing member, wherein the another fixing member is disposed on the first outer edge and near the fourth portion, the fourth portion has a fourth outer edge, a width of the fourth portion at a connecting position between the first portion and the fourth portion is equal to or greater than a distance between the fourth outer edge and a center of the another fixing member.

4. The display device according to claim 3, wherein the fourth portion comprises a second stripe part and a second extending part contacting the second stripe part and the first portion, and the second extending part of the fourth portion extends from the second stripe part of the fourth portion toward the opening.

5. The display device according to claim 1, wherein the second portion comprises a first stripe part and a first extending part, the first extending part contacts the first stripe part and the first portion.

6. The display device according to claim 5, wherein the first extending part extends from the first stripe part toward the opening.

7. The display device according to claim 6, wherein the width of the second portion at the connecting position between the first portion and the second portion is between 10% and 15% of a length of the first portion.

8. The display device according to claim 6, wherein the first extending part substantially has a triangular shape, a rectangle shape, a fan shape or a platelet shape having an arced edge.

9. The display device according to claim 1, wherein the back cover includes a hinge adjacent to the first portion and corresponding to the fixing member, and the hinge is used for combining the stiffener with the back cover.

10. The display device according to claim 1, wherein the fixing member comprises a first side and a second side opposite to the first side, the second side is farther away from the second outer edge than the first side from the second outer edge, and a distance between the second outer edge and the first side of the fixing member is greater than zero.

11. The display device according to claim 1, further comprising a junction between the opening and the main body, wherein the junction has an arced edge.

12. The display device according to claim 1, further comprising a backlight module disposed between the stiffener and the display panel, wherein the stiffener supports the backlight module.

* * * * *